United States Patent [19]
Tyan et al.

[11] Patent Number: 5,612,109
[45] Date of Patent: *Mar. 18, 1997

[54] OPTICAL STORAGE MEDIUM INCLUDING MULTIPLE DATA LEVELS MADE OF CO/PT MAGNETO-OPTIC RECORDING MEDIA

[75] Inventors: Yuan-Sheng Tyan; Giuseppe Farruggia, both of Webster; Tukaram K. Hatwar, Penfield, all of N.Y.

[73] Assignee: Eastman Kodak Company, Rochester, N.Y.

[*] Notice: The term of this patent shall not extend beyond the expiration date of Pat. No. 5,407,755.

[21] Appl. No.: 615,367

[22] Filed: Mar. 14, 1996

[51] Int. Cl.⁶ .......................................... B32B 3/00
[52] U.S. Cl. ...................... 428/64.1; 428/64.2; 428/64.3; 428/64.4; 428/64.7; 428/336; 428/611; 428/694 ML; 428/694 MM; 428/900; 428/913; 428/928
[58] Field of Search ................... 428/64.1, 64.2, 428/64.3, 64.4, 64.7, 336, 668, 611, 694 ML, 694 MM, 900, 913, 928

[56] References Cited

U.S. PATENT DOCUMENTS

| | | | |
|---|---|---|---|
| 4,450,553 | 5/1984 | Holster et al. | 369/275 |
| 5,202,875 | 4/1993 | Rosen et al. | 369/94 |
| 5,255,262 | 10/1993 | Best et al. | 369/275.1 |
| 5,381,401 | 1/1995 | Best et al. | 369/275.1 |

OTHER PUBLICATIONS

"Multilevel Volumetric Optical Storage" by Rubin, et al., SPIE vol. 2338 Optical Data Storage (1994), pp. 247–253.

*Primary Examiner*—Patrick Ryan
*Assistant Examiner*—Elizabeth Evans
*Attorney, Agent, or Firm*—Raymond L. Owens

[57] ABSTRACT

An optical data storage medium is disclosed. The medium includes multiple data storage levels and each storage level comprising a transparent dielectric seed layer and a partially transmissive recording layer having a multilayer structure including alternating layers of Co/Pt on to said seed layer.

13 Claims, 8 Drawing Sheets

5,612,109

OPTICAL STORAGE MEDIUM INCLUDING MULTIPLE DATA LEVELS MADE OF CO/PT MAGNETO-OPTIC RECORDING MEDIA

CROSS REFERENCE TO RELATED APPLICATIONS

The present application is related to U.S. application Ser. No. 08/076,326 filed Jun. 14, 1993 by Charles F. Brucker, Tukaram K. Hatwar and Yuan-Sheng Tyan, and entitled "Multilayer Magnetooptic Recording Media", now U.S. Pat. No. 5,407,755 issued Apr. 18, 1995; U.S. application Ser. No. 08/076,604 filed Jun. 14, 1993, now U.S. Pat. No. 5,565,266 by Tukaram K. Hatwar, Yuan-Sheng Tyan, Anthony C. Palumbo and Charles F. Brucker and entitled "Multilayer Magnetooptic Recording Media"; U.S. application Ser. No. 08/209,933 filed Mar. 11, 1994 by Tukaram K. Hatwar and Yuan-Sheng Tyan entitled "Multilayer Magnetooptic Recording Media"; U.S. application Ser. No. 08/316,743 filed Oct. 3, 1994 by Tukaram K. Hatwar and Yuan-Sheng Tyan entitled "Multilayer Magnetooptic Recording Media"; and U.S. application Ser. No. 60/002,798 filed simultaneously herewith by Yuan-Sheng Tyan, G. Farruggia and Tukaram K. Hatwar entitled "Forming a High Performance Co/Pt Disk".

1. Field of the Invention

This invention relates to a magneto-optical disk having multiple data levels for increased storage capacity of the disk. More specifically it relates to a magneto-optical disk having Co/Pt multilayers with improved media structure and stability.

2. Background of the Invention

An optical disk with multiple data levels are used to increase the capacity of the disk (for example, see references: Rubin et al SPIE vol. 2338(1994)247; Holster et al, U.S. Pat. No. 4,450,553(1984); Rosen et al U.S. Pat. No. 5,202,875; Best et al, U.S. Pat. No. 5,255,262; Best et al, U.S. Pat. No. 5,381,401). Data are selectively accessed by the laser beam from the different recording levels by changing the focal position of the focusing lense. The storage medium used for this purpose is typically non-metallic transmissive materials such as dyes and GeTe-based phase change materials (U.S. Pat. No. 5,381,401). Rare-earth-transition-metal alloy (RE-TM) thin films also are suggested as a magneto-optical storage medium for this purpose. However, it is difficult to prepare multilevel disk structure using RE-TM based alloy thin layers. First, they are metallic and highly absorbing in nature. Second, these materials are highly corroding and susceptible to oxidation. Dielectric layers of AlN or SiN greater than 80 nm thick are used to protect these materials for environmental stability. Even though these films can be made thinner to increase the transmissive through the film, the long term stability of such thin RE-TM based media is a major concern. Also, at such smaller thickness the Kerr rotation and the coercivity of the RE-TM-based magneto-optical film is significantly reduced. Thus it difficult to prepare a high performance multilevel disk structure using RE-TM based magneto-optic media.

SUMMARY OF THE INVENTION

It is an object of this invention to prepare a magneto-optic disk with multilevel disk structure using Co/Pt superlattices with a high coercivity and a good squareness of the Kerr hysteresis loop.

A further object of the present invention is to provide an improved media structure having a Co/Pt multilayer but with increased performance such as low media noise, high carrier to noise ratio and improved manufacturing throughput.

Co/Pt multilayers have perpendicular magnetic anisotropy, large Kerr rotations at short wavelengths and excellent environmental stability. We found unexpectedly that seed layers when deposited at low sputtering pressure of less than 5 mT Kr enhance the coercivity, squareness and perpendicular anisotropy of Co/Pt multilayer. Such enhancement becomes even more pronounced when the thickness of the seed layer formed of indium-tin-oxide is reduced below 16 nm.

The above objects are achieved in an optical data storage medium comprising:

a) multiple data storage levels, and b) each storage level comprising a transparent dielectric seed layer and a partially transmissive recording layer having a multilayer structure including alternating layers of Co/Pt on to said seed layer.

Advantages

The following are advantages of magneto-optic media made in accordance with this invention:

1) the resulting magneto optic medium has a large coercivity, high squareness of the Kerr hysteresis loop, high perpendicular anisotropy, low recording noise and high carrier to noise ratio;

2) it permits use of very thin layer of Co/Pt for recording media and still possessing very high coercivity and squareness of the Kerr hysteresis loop and radiation transmission through the layers;

3) the thinness of the Co/Pt superlattice and In-Sn-O seed layer require less deposition time and thus increases the production throughput during manufacturing; and 4) permits preparation of a high performance multilevel disk structure such as shown in U.S. Pat. No. 5,381,401 issued Jan. 10, 1995 by use of partially transmissive ultra-thin recording layers which have enough transmission, reflection and absorption for each recording level.

DETAILED DESCRIPTION OF THE INVENTION

Figure 1:
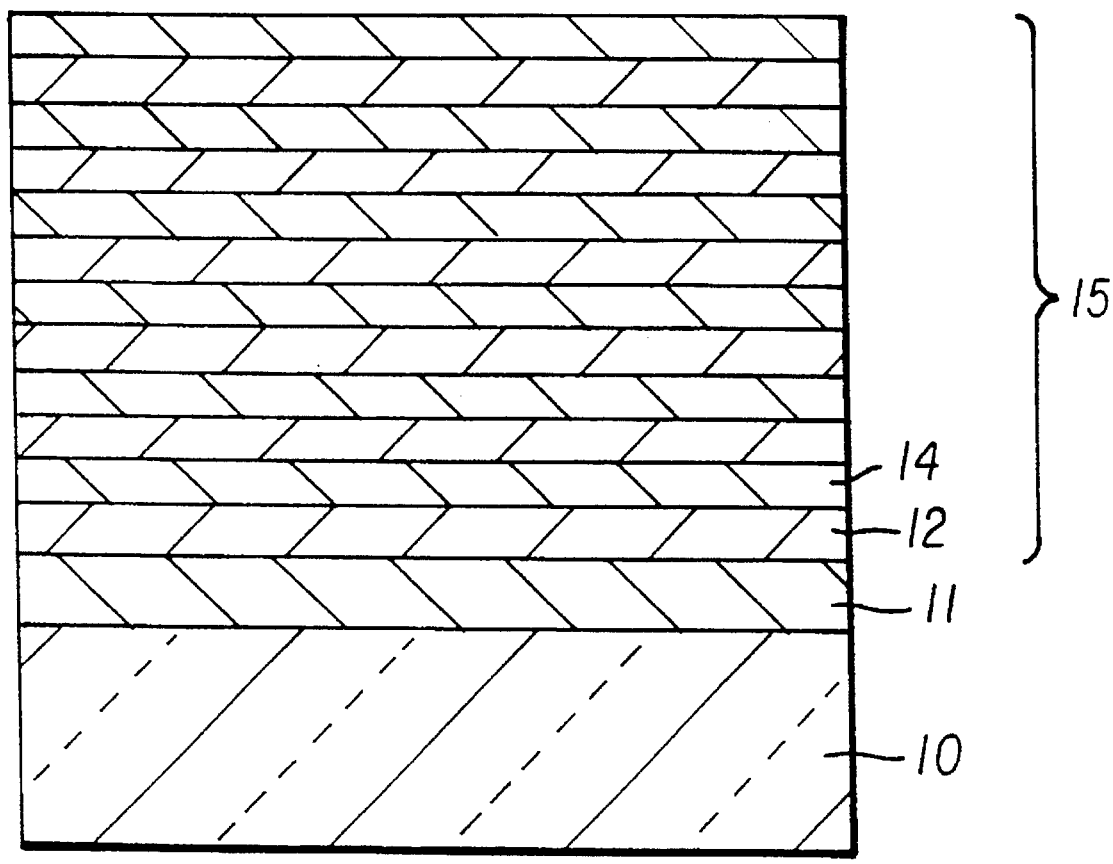
FIG. 1 shows a multilayer magneto-optic disk structure made by depositing alternating layers of Co and Pt.

Turning first to FIG. 1, a schematic shows a substrate 10 which is made of polycarbonate and a seed layer 11 made of indium-tin oxide. There is shown a multilayer recording element 15 having alternating bilayers of Pt layer 12 and Co layer 14. Generally the substrate is transparent as light from a laser or other source will illuminate a recording multilayer structure as described through the substrate. On the substrate are provided a multilayer structure formed of alternating layers of Pt layer 12 and Co layer 14. Between the substrate and the multilayered recording element is the seed layer 11, which will be discussed later. Preferably, a UV curable lacquer overcoat 18 is provided on top of the multilayer structure. An example of such a lacquer is "Dyecure Clear SD-17", a UV curable acrylic resin available from Dainippon Ink and Chemicals, Inc. The lacquer is typically applied by a spin coating technique and cured in the presence of UV light. This structure is particularly suitable for use in magnetooptic disk, compact disk (CD) and photo compact disk (Photo CD).

With this type of structure, incident laser light illuminates a particular portion of the substrate, passes through the substrate, and interacts with the multilayered structure changing the Kerr rotation. As is well known, during readout, the Kerr rotation can be monitored to indicate whether a bit has been recorded.

The seed layers made of indium-tin-oxide were prepared by d.c. sputtering a homogenous target having varying amounts of $In_2O_3$ and $S_nO_2$ prepared by hot press method. Kr gas was used for sputtering but other gases such as Ar, Xe or their mixture with or without oxygen content can be used. The sputtering pressure and deposition rate were 1–100 mT Kr and 0.2–1.2 mm/second, respectively.

Co/Pt multilayers were prepared by d.c. sputtering Co and Pt targets. The base pressure before depositing the structure was about $1\times10^{-5}$–$1\times10^{-6}$ Toor and deposition pressure was about 5–100 mT. Alternate layers of Co and Pt were deposited onto a substrate spinning at 20–250 revolutions per minute over the Co and Pt targets. The thickness of each layer was controlled by controlling the deposition rate and the substrate rotation speed. The thickness of Co and Pt were 0.2–0.8 and 0.4–1.8 nm respectively and the number of bilayers was 2–25. The deposition was done using Kr gas but other gases such as At, Xe or their mixtures can be used.

Several test samples were prepared by depositing the Co/Pt multilayers without and with seed layers on small test samples of glass and polycarbonate (PC) substrates. Structures were also deposited on the 5.25 inch dia. glass and PC substrates.

The perpendicular Kerr hysteresis loops were measured at 780 nm wavelength to obtain coercivity (Hc) and the Kerr rotation (Ok) of the structures. The dynamic measurements of the magneto-optic structures were made under the following conditions: 6.03 m/sec disk velocity, 3.87 MHz carrier frequency, 90 ns write laser pulse, 30 kHz bandwidth, 300 Oe bias field, 0–10 mW write power and 1.5–2.0 mw read power.

Figure 2:
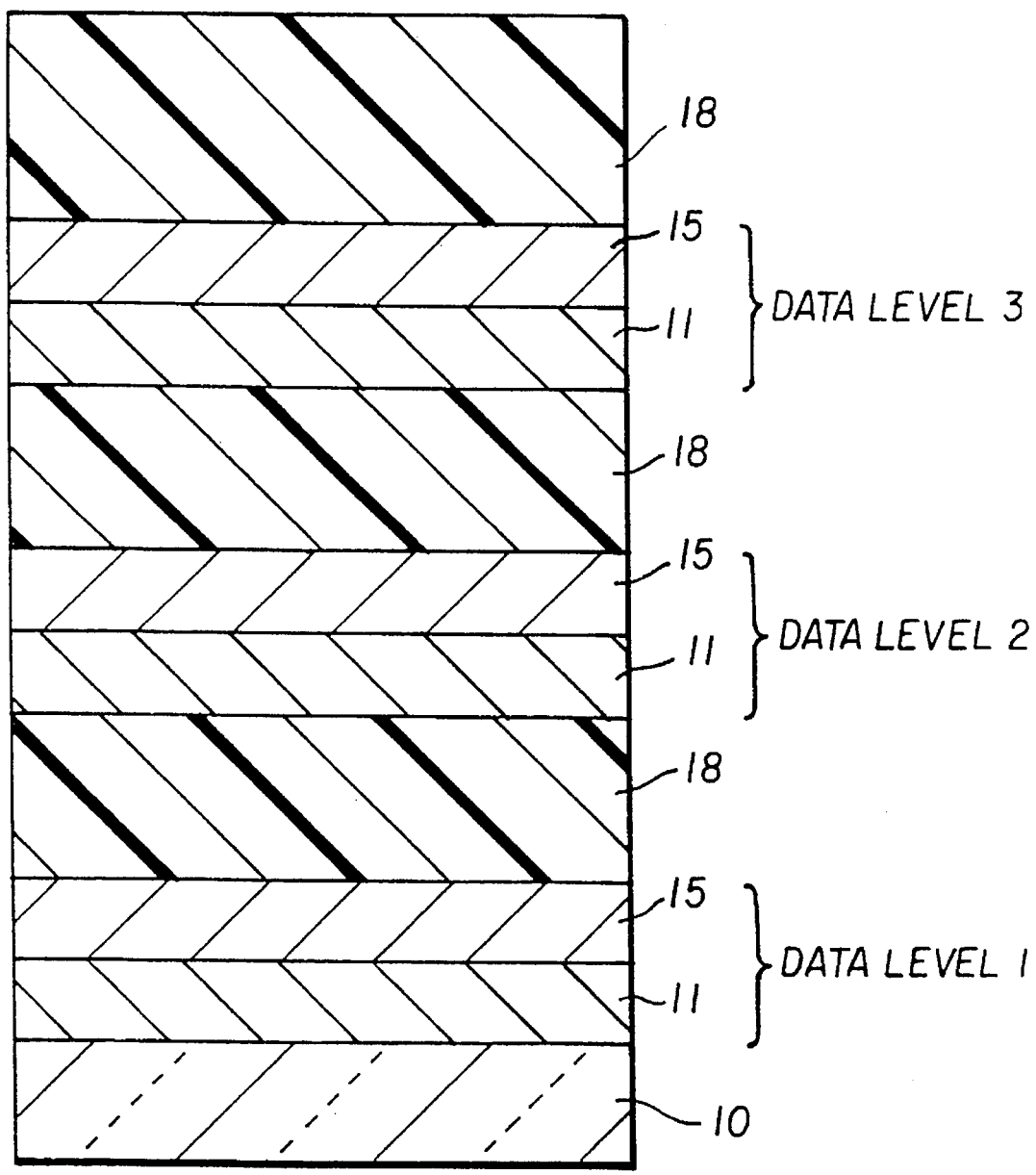
FIG. 2 shows a multilevel magneto-optic disk structure made in accordance with the invention.

The main requirements for the multilevel scheme is to have distinct data levels which are partially transmissive and separated by a spacer region. Turning now to FIG. 2 where an optical data storage medium in accordance with the present invention is shown. The medium includes three data levels, but it will be understood that more than that number can also be used in accordance with the present invention. Each data level includes a seed layer 11, a Co/Pt multilayer 15, and a UV-cured lacquer layer 18. The top UV-cured lacquer layer 18 is, of course, also an overcoat. For a more complete description, the structure of these particular elements, reference should be made to the discussion in FIG. 1. The entire structure is mounted on a substrate 10.

For the first data level the transmission should be maximum (at least >40%). This facilitates the laser radiation positioned on the one side of the disk structure to penetrate the first and subsequent layers and the recording or read out can be performed without the use of excessive laser power. For a high performance Co/Pt superlattice disk the desirable thickness is greater than 15 nm. Also sputter deposition is a method of choice for high throughput manufacturing the Co/Pt superlattice magneto-optic media and sputtering pressure is kept less than 15 mT. It was observed earlier that the squareness of the Kerr hysteresis loop and the anisotropy energy is very small when the Co/Pt multilayers are deposited at a sputtering pressure above 15 mT. (For example, see references, Carcia et al J. Mag. Magn. Mat. 121(1993)452; Hashimoto et al J. Mag. Magn. Mat. 88(1990)211; Zeper et al J. Appl. Phys. 70(1991)2264, Ochiai et al IEEE Trans. MAG 25 (1989)3755, and Ochiai et al, European Patent Appl. 0304873 (1988). These multilayers have poor crystalline quality and the optical noise is unacceptably high. Thus the useable sputtering pressure for depositing Co/Pt with satisfactory performance was limited to less than 15 mT (see reference, International Patent Appl. WO/91/08578 by Carcia, "Process for sputtering multilayers for magneto-optic recording", 1991). Also, Co/Pt media having greater than 15 nm thickness and deposited using conventional sputter deposition conditions such as use of low sputtering pressure is opaque to light transmission. The laser energy is totally absorbed in the recording layer and is not able to pass through the subsequent layers. Thus Co/Pt superlattices of these thickness prepared in a conventional manner cannot be used for multilevel recording scheme.

Figure 3:
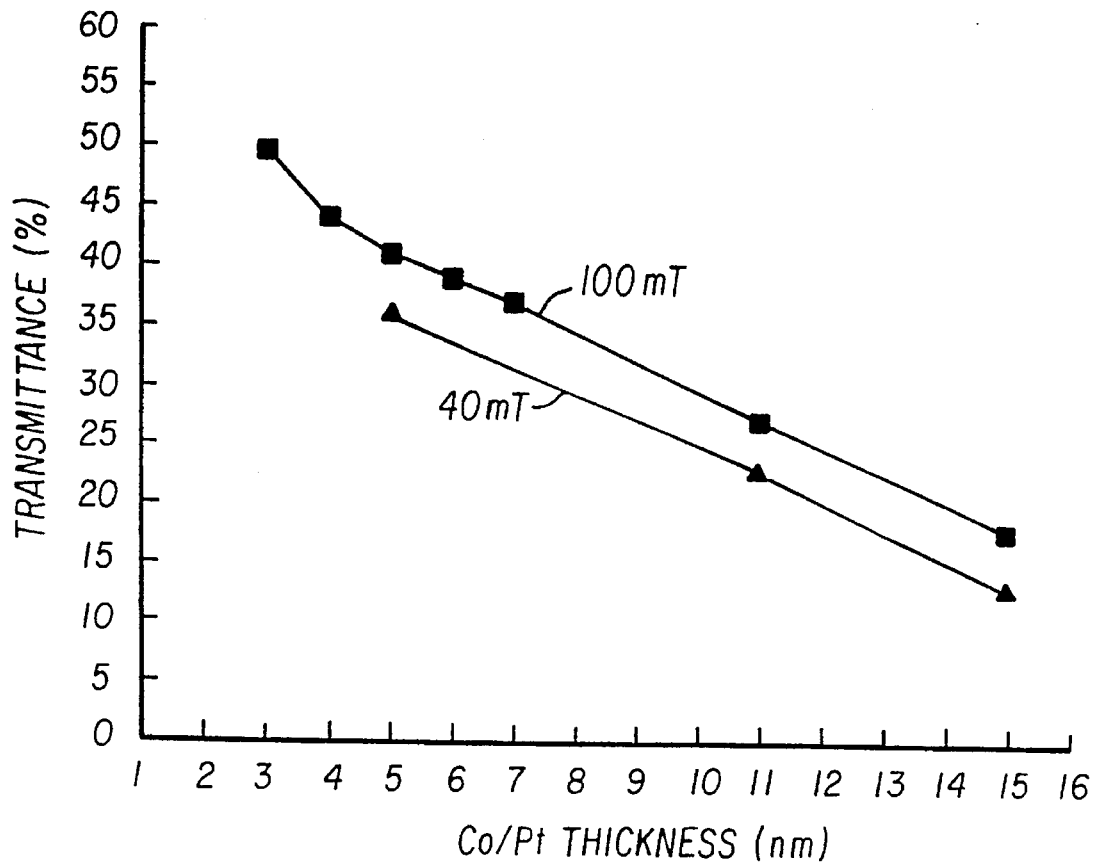
FIG. 3 shows a plot of transmittance in the Co/Pt film as a function of Co/Pt recording layer thickness.

The transmission through the multilayer can be increased by decreasing the thickness of the Co/Pt multilayer. FIG. 3 shows the transmission for various thickness of the Co/Pt multilayer deposited on glass substrate. The sputtering pressure for Co/Pt superlattice was 40 mT and 100 mT of krypton. Thickness of the Co and Pt sublayers were 0.25 nm and 0.7 nm respectively. The number bilayers were adjusted to give an approximate film thickness. In all the experiments, 3.5 nm transparent In-Sn-O film deposited at 1 mT Kr was used as a seed layer for depositing Co/Pt.

Figure 4A:
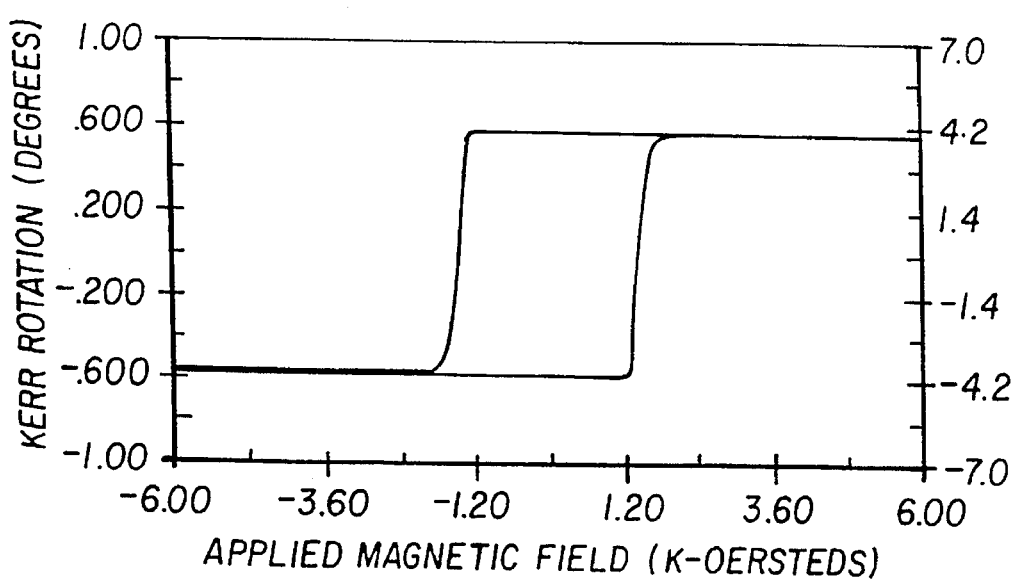
FIGS. 4A and 4B show the Kerr hysteresis loops for Co/Pt multilayer films having 15 nm and 5 nm thickness, respectively, and deposited at 40 mT Kr sputtering pressure and wherein the seed layer of indium-tin-oxide is selected to have a thickness of 3.5 nm and was deposited at 1 mT.
Figure 4B:
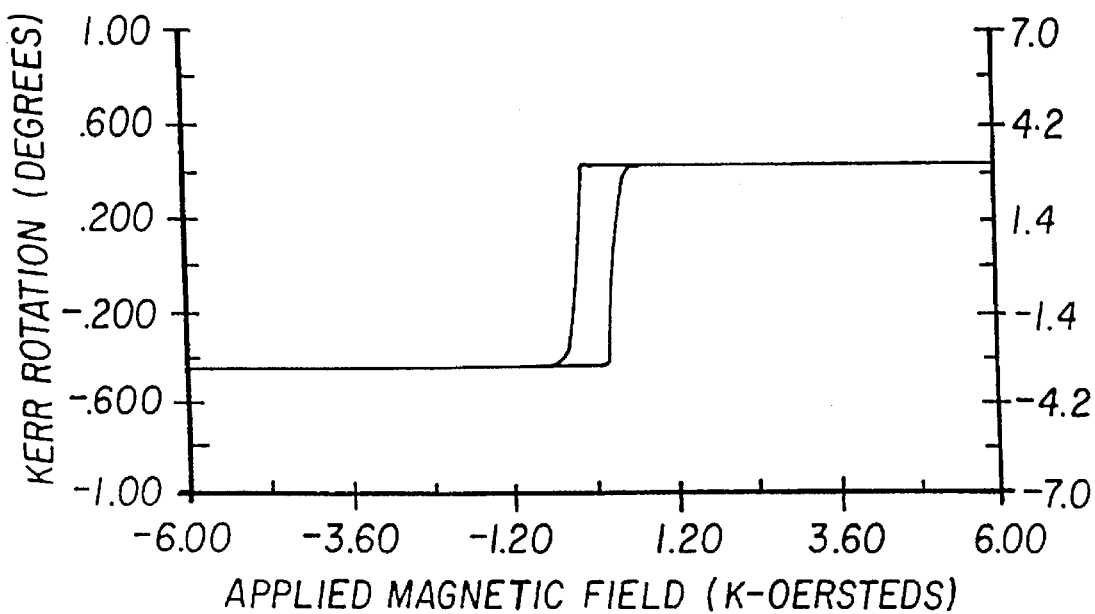

As shown in FIG. 3 the transmission through the film increases with decreasing the Co/Pt film thickness. Also Co/Pt multilayer deposited at higher pressure has higher transmission through the multilayer. But the magnetic coercivity of the film shows an adverse effect with decreasing multilayer thickness. It decreases rapidly with the decreasing film thickness. For example, FIGS. 4A and 4B show the Kerr hysteresis loops of the 15 nm and 5 nm Co/Pt films deposited at 40 mT Kr. It shows that the coercivity has decreased dramatically from 1446 Oersted for 15 nm thick film to a significantly a lower value of 256 Oersted for 5 nm thick film. Such a low coercivity film can not be used for magneto-optic recording. First, it is difficult to write on this film even with a low bias field. Secondly, the recorded is data is very unstable.

Figure 5:
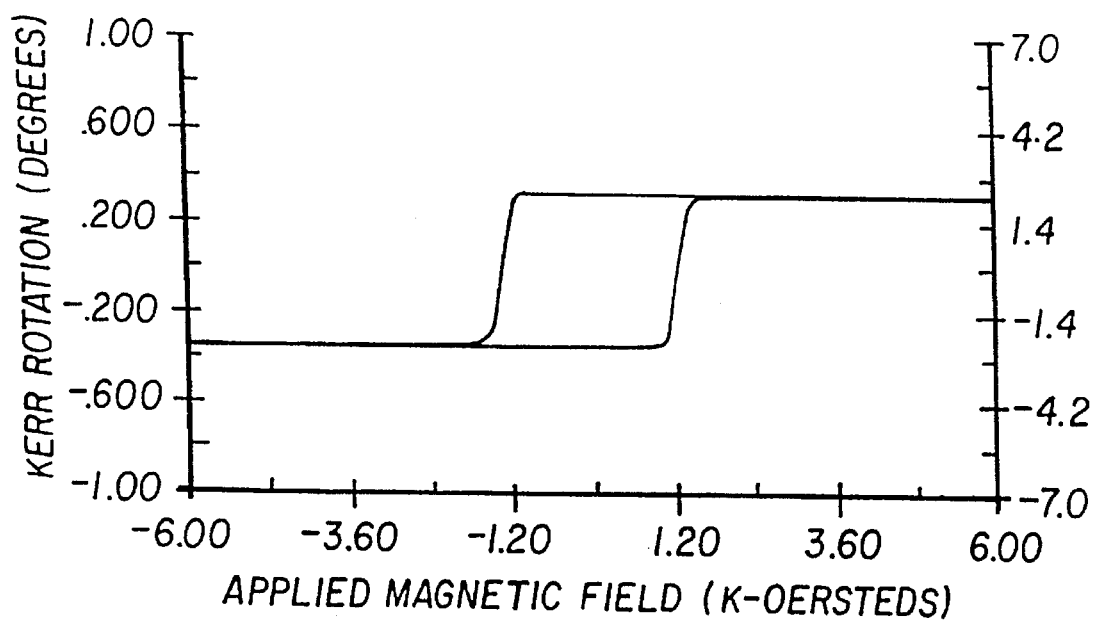
FIG. 5 shows a Kerr hysteresis loop for 5 nm Co/Pt film deposited at 100 mT Kr sputtering pressure and wherein the seed layer of indium-tin-oxide is selected to have a thickness of 3.5 nm and was deposited at 1 mT.

We unexpectedly found that very thin Co/Pt multilayer can be used as the recording layer if the Co/Pt medium is deposited at an unusually high sputtering pressure. FIG. 5 shows the Kerr hysteresis loops of the 5 nm Co/Pt multilayer deposited at 100 um Kr. This multilayer has a coercivity of 1275 Oe and high Kerr hysteresis loop squareness.

Figure 6:
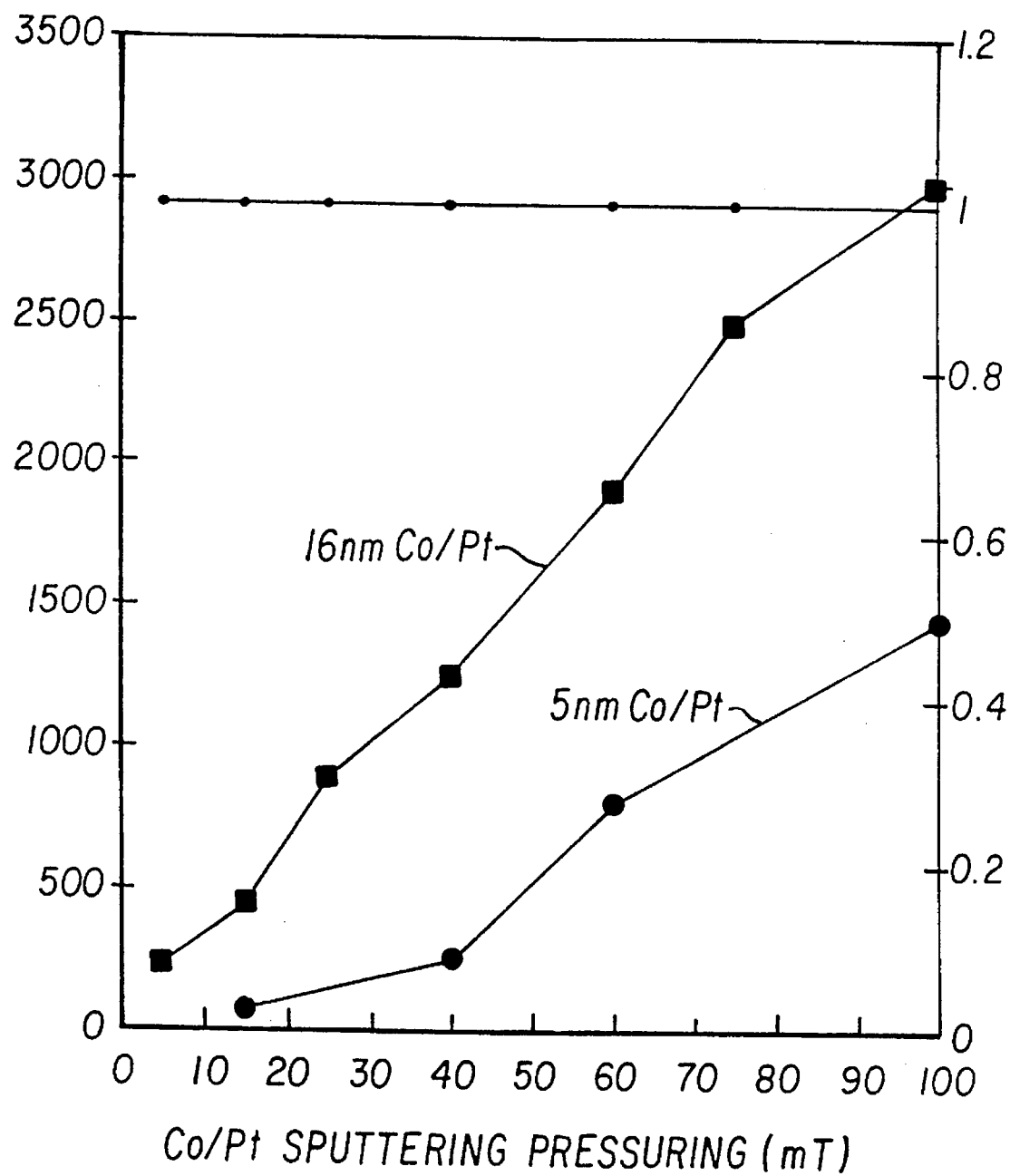
FIG. 6 shows plots of coercivity as a function of Co/Pt thickness wherein Co/Pt sputtering pressure was 40 mT and 100 mT of krypton gas and wherein the seed layer of indium-tin-oxide is selected to have a thickness of 3.5 nm and was deposited at 1 mT.

FIG. 6 shows a plot of coercivity and the squareness of the Kerr hysteresis loop as a function of sputtering pressure for a 5 nm thick Co/Pt multilayer film. The coercivity increases with the sputtering pressure as seen above. Simultaneously, squareness of the Kerr hysteresis loop remains high, even in the Co/Pt multilayer deposited at sputtering pressure in excess of 30 mT.

Figure 7:
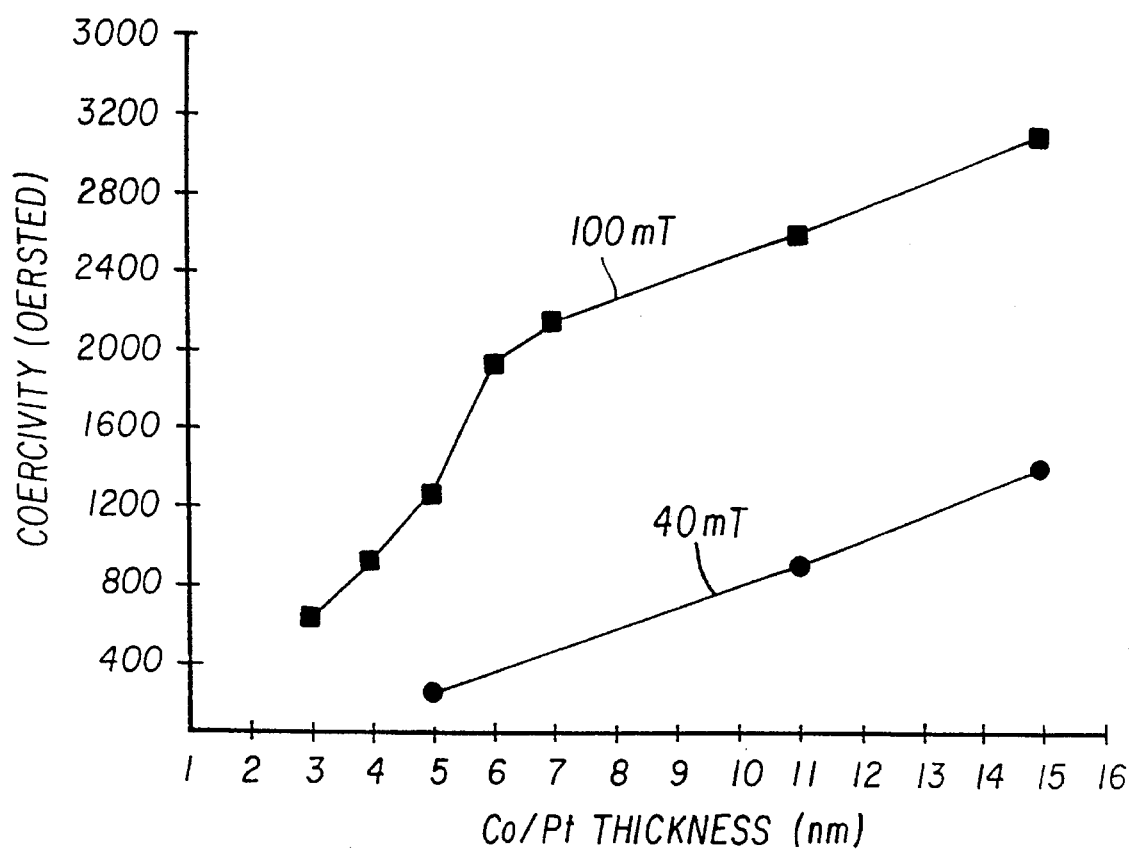
FIG. 7 is a plot which shows coercivity and the Kerr hysteresis loop squareness as a function of Co/Pt sputtering pressure wherein thickness of the Co/Pt is 5 nm and wherein the seed layer of indium-tin-oxide is selected to have a thickness of 3.5 nm and was deposited at 1 mT.

FIG. 7 shows the coercivity of the Kerr hysteresis loop as a function of Co/Pt multilayer thickness. The sputtering pressure for the Co/Pt was 40 mT and 100 mT Kr. As can be seen from this view that even the 3 nm thick Co/Pt film has good coercivity when the Co/Pt sputtering pressure is 100 mT. Thus, it was possible to prepare a very thin Co/Pt medium which has high o transmission and also high coercivity when the sputtering pressure was unusually high such as 100 mT.

Figure 8:
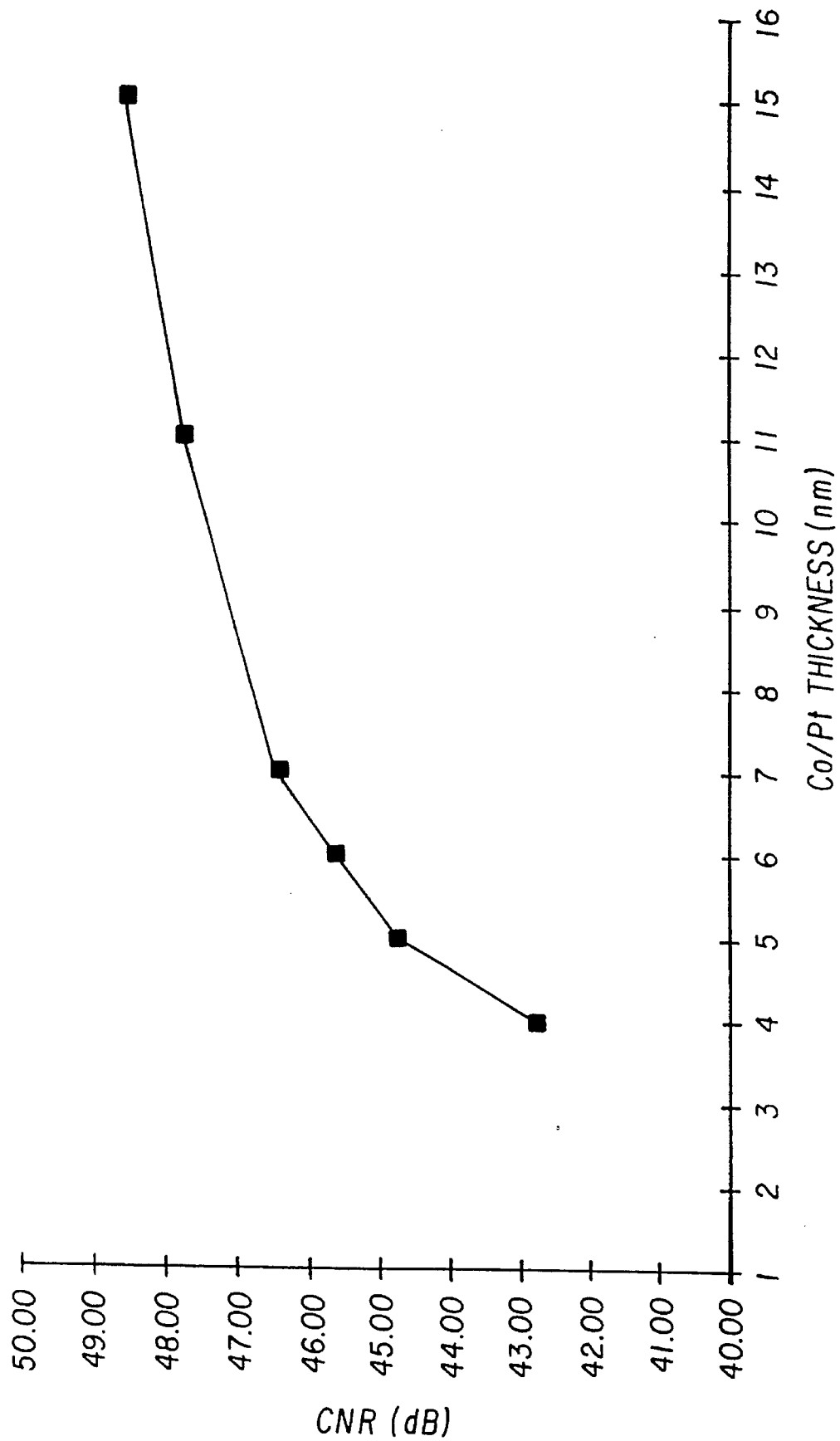
FIG. 8 shows Carrier to Noise ratio as a function of Co/Pt multilayer thickness wherein Co/Pt films was deposited at 100 mT Kr pressure and wherein the seed layer of indium-tin-oxide is selected to have a thickness of 3.5 nm and was deposited at 1 mT.

Various thickness of such film sputtered at 100 mT Kr pressure were deposited on the glass substrate and their dynamic performance was measured. FIG. 8 shows the Carrier to Noise ratio (CNR) as a function of Co/Pt film thickness. CNR of 44 dB was obtained from a very thin structure such as 5 nm Co/Pt.

Figure 9A:
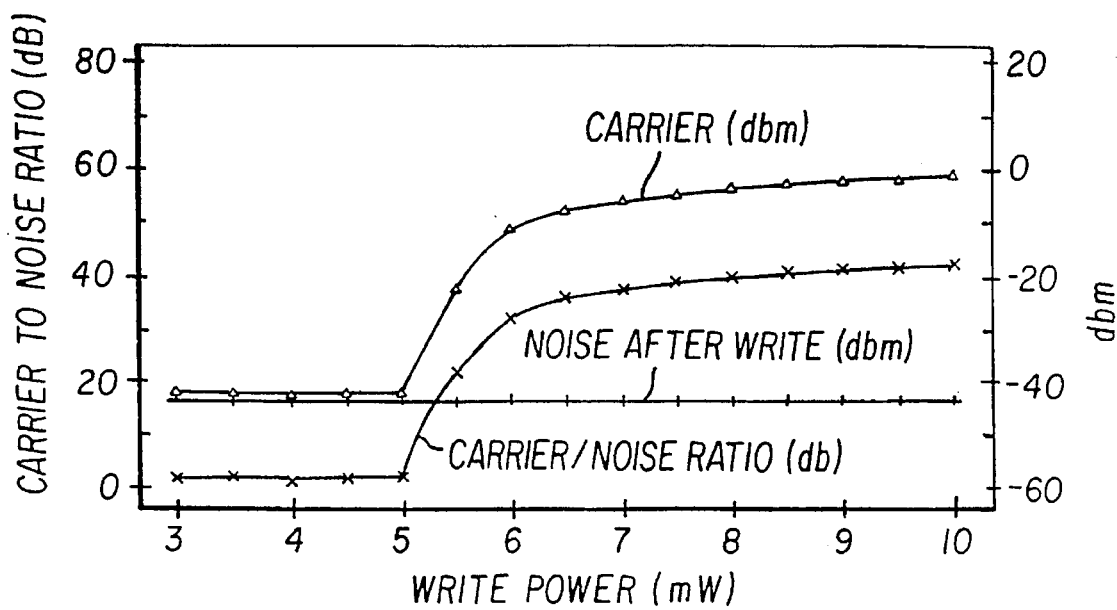
FIGS. 9A and 9B show the recording performance for the first data level and the second data level obtained from the two-level disk structure.
Figure 9B:
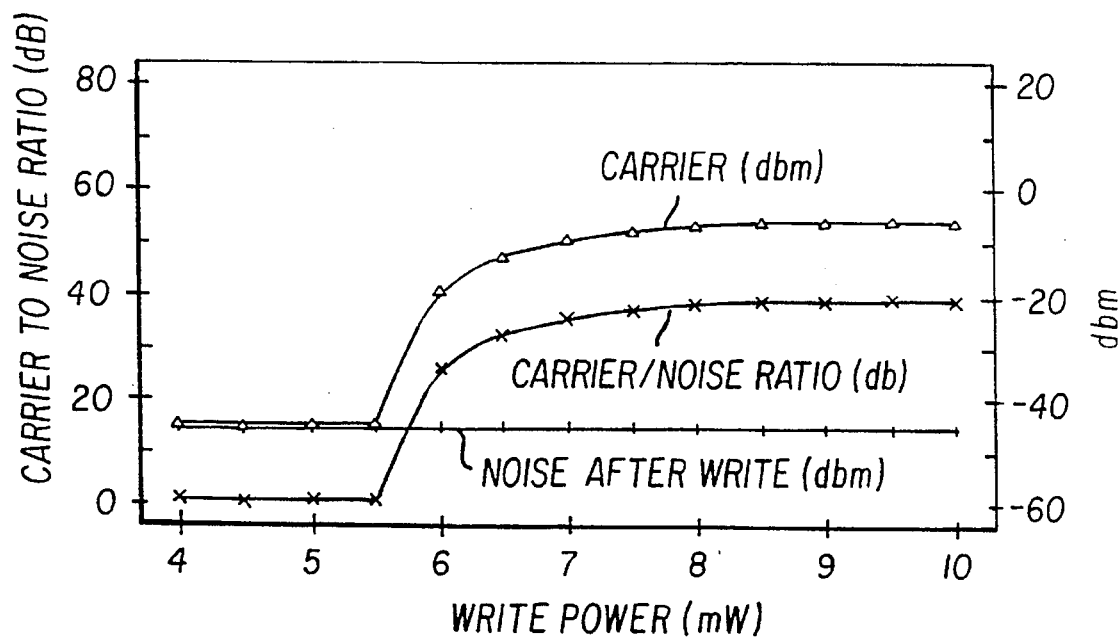

A two-level disk structure as shown in FIG. 2 was prepared as follows: First a data level 1 recording layer was deposited by sputter depositing 5 nm thick alternating layers of Co/Pt at a sputtering pressure of 100 mT Kr on to a 3.5 nm thick In-Sn-O seed layer deposited at 1 mT Kr on the on the 5.25" dia. glass substrate. A 20 µm lacquer layer which acts as a spacer was overcoated by spin coating on the Co/Pt multilayer. Then data level 2 recording layer consisting of 3.5 nm In-Sn-O seed layer deposited at 1 mT Kr followed by 20 nm Co/Pt multilayer deposited at 100 mT Kr was deposited on the lacquer layer. Finally a second layer of 20 um lacquer was spin coated as a protective overcoat. This disk was tested by focussing the 780 nm wavelength laser beam first on the recording level 1 and then on the level 2. The experimental conditions were as follows: 2 mW read Power, 300 Oe Bias field, 5–10 mW write power, 30 kHz bandwidth, 1.9 MHz carrier, 0.7 µm mark size. FIGS. 9A and 9B show the recording performance obtained from data level 1 and data level 2, respectively. CNR's of 43 dB and 41 dB were obtained from level 1 and level 2, respectively, thus demonstrating the two-level recording scheme using Co/Pt superlattices. This performance can be further improved by optimizing the disk structure, deposition conditions and the test procedure.

In the above examples, results were described using indium-tin-oxide seed layers. We also used other seed layers such as ZnO, Zn—Sn—O, and SiC and found similar beneficial effects as above when the seed layer of thickness less than 16 nm were deposited below sputtering pressure of 5 mT and thin Co/Pt multilayers were deposited at a sputtering pressure of greater than 15 mT.

The invention has been described in detail with particular reference to certain preferred embodiments thereof, but it will be understood that variations and modifications can be effected within the spirit and scope of the invention.

PARTS LIST 10 substrate
11 seed layer
12 Pt layer
14 Co layer
15 multilayer recording element
18 overcoat

We claim:

1. An optical data storage medium comprising:
   a) multiple data storage levels, and
   b) each storage level comprising a transparent dielectric seed layer and a partially transmissive recording layer having a multilayer structure including alternating layers of Co/Pt on to said seed layer.

2. The optical storage medium of claim 1 wherein the said seed layer has a thickness of less than or equal to 16 nm.

3. The optical storage medium of claim 1 wherein the Co/Pt multilayers were prepared by sputtering and the sputtering pressure for making the Co/Pt recording layer is above 15 mT.

4. The optical storage medium of claim 1 wherein said dielectric seed layer is deposited by sputtering at a sputtering pressure of less than 5 mT.

5. The magneto-optic recording medium of any claim 4 wherein said multilayer film contains 2–20 bilayers of Co and Pt, the thickness of each of Co and Pt layers being uniform and between 0.2 to 0.8 nm and 0.4 to 1.8 nm, respectively.

6. The magneto-optic medium of claim 1 wherein a sputtering gas selected from the group consisting of Ar, Kr or Xe and their mixture is used to sputter the Co and Pt multilayer.

7. The magneto-optic medium of claim 1 wherein a sputtering gas selected from the group consisting of Ar, Kr or Xe and their mixture with or without oxygen or nitrogen is used to sputter the seed layer.

8. The method of claim 1 wherein the seed layers includes material is selected from the group of $(In_2O_3)_{1-x}(SnO_2)_x$, where x=0.25–0.75, SiC, ZnO and $(Zn)_{1-y}(Sn)y(O)_{1+y}$, where y=0.15–0.75.

9. The optical storage medium of claim 1 wherein each recording layer is sandwiched between two transparent dielectric surfaces optimized to give maximum figure of merit.

10. The optical recording medium of claim 1 wherein a 2–100 µm thick UV-cured lacquer is overcoated on each recording layer.

11. The magneto-optic recording medium of any claim 1 wherein said multilayer film contains 2–20 bilayers of Co and Pt, the thickness of each of Co and Pt layers being uniform and between 0.2 to 0.8 nm and 0.4 to 1.8 nm, respectively.

12. The optical medium of claim 1 wherein the thickness of the first recording layer is minimum and thickness of the last recording layer is maximum.

13. The optical medium of claim 1 wherein a lacquer overcoat is deposited by spin coating on the last recording level.

* * * * *